Feb. 21, 1967　　　K. M. HOSENFELD　　　3,304,844
CAN BODY CONSISTING OF SEVERAL LAYERS, AND PROCEDURE
AND DEVICE TO MANUFACTURE IT
Filed Dec. 3, 1964　　　　　　　　　　　　　　3 Sheets-Sheet 1
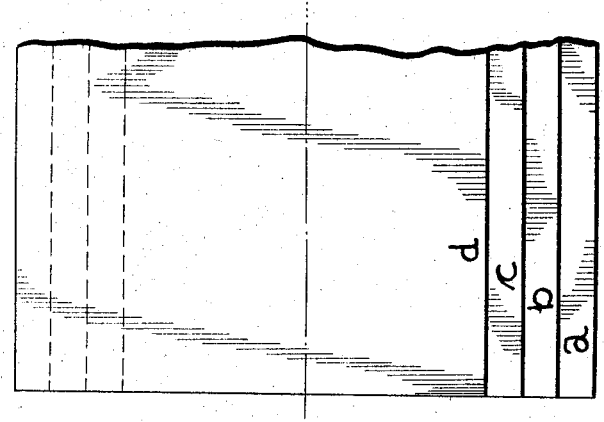
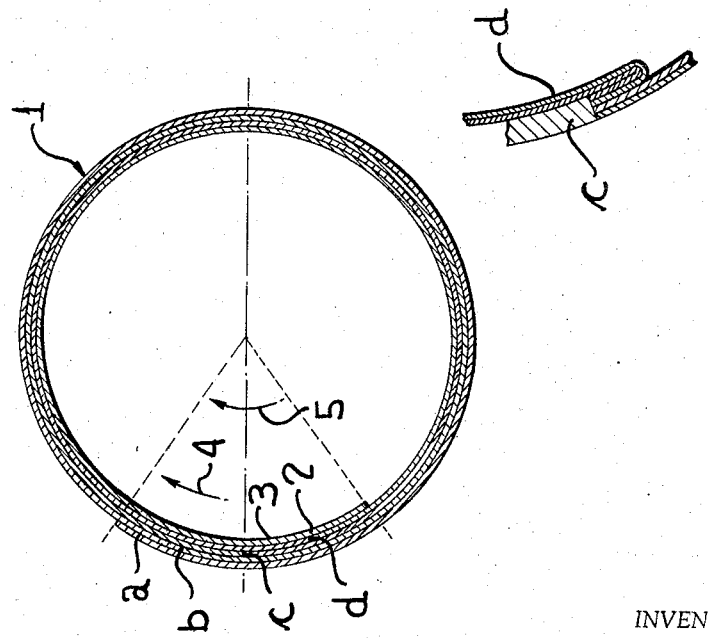
INVENTOR
KLAUS MANFRED HOSENFELD
BY Mason, Porter, Diller & Stewart
ATTORNEYS Feb. 21, 1967  K. M. HOSENFELD  3,304,844
CAN BODY CONSISTING OF SEVERAL LAYERS, AND PROCEDURE
AND DEVICE TO MANUFACTURE IT
Filed Dec. 3, 1964  3 Sheets-Sheet 2

INVENTOR
KLAUS MANFRED HOSENFELD

BY
*Mason, Porter, Diller & Stewart*
ATTORNEYS

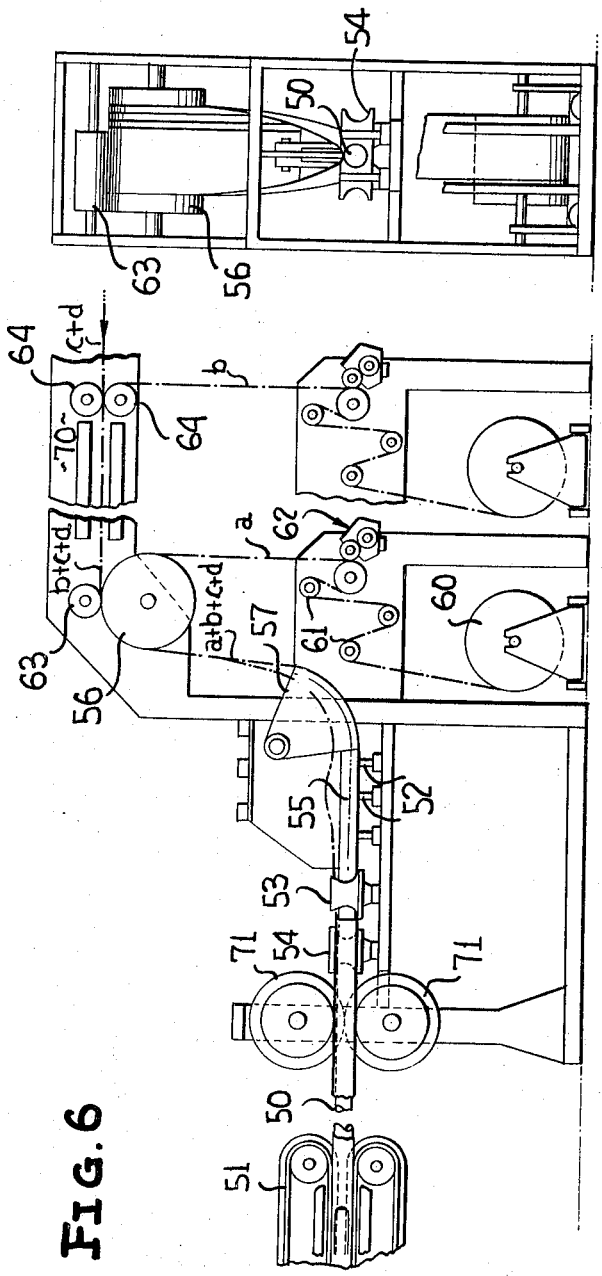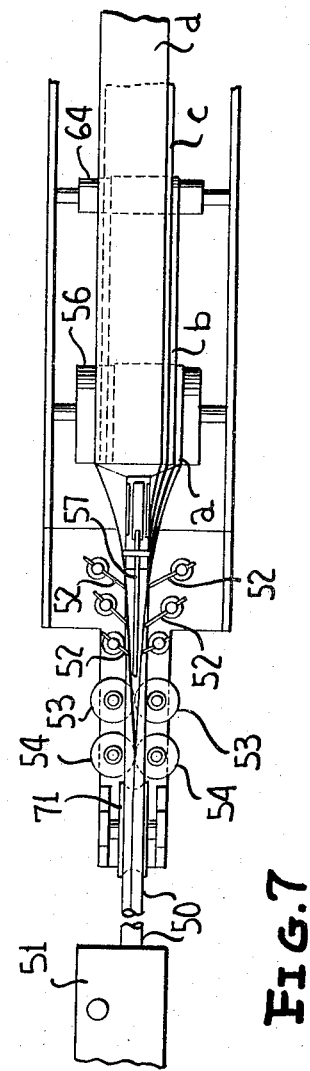

United States Patent Office

3,304,844
Patented Feb. 21, 1967

3,304,844
CAN BODY CONSISTING OF SEVERAL LAYERS, AND PROCEDURE AND DEVICE TO MANUFACTURE IT
Klaus M. Hosenfeld, Lubeck-Kucknitz, Germany, assignor to J. A. Schmalbach Aktiengesellschaft, Braunschweig, Germany
Filed Dec. 3, 1964, Ser. No. 415,693
Claims priority, application Germany, Dec. 4, 1963, Sch 34,271
9 Claims. (Cl. 93—82)

The present invention relates to the manufacture of can bodies each consisting of several layers of different materials, especially one consisting of paper and/or cardboard which, if so desired, may be coated, lined or backed, and which materials, in at least the internal and the external layers, have been overlapped at the longitudinally extending margins or edges. It is known that such can bodies are employed for a great number of purposes, especially for the storage and the transportation of liquids. In such uses the internal layer would consist of a material which is impervious to liquids, or of a material which is not impervious to liquids, but which is lined with another material having such properties.

The stability of shape, or nondeformability and the strength of such can bodies depends in a large measure upon the strength of the wall of the body, and upon the evenness of the wall thickness thereof. Such strength can be increased in an arrangement wherein the layers are overlapped at their longitudinal margins or edges, so that said layers cooperate in forming closed bodies each appearing somewhat as a hose or tube. This overlapping of the longitudinal edges in known bodies has resulted in the provision of objectionable wall thickness here and there in the body, such thickness problems appearing especially when many or even all of the layers are made to overlap.

The present invention has for a purpose, solution of the problem of creating a body of a can which shows a high strength and a great stability of shape, yet one wherein the wall thickness is generally the same all over.

This problem has been solved as herein described by arranging the longitudinal edges of the layers which face each other so that they contact each other closely. In the novel structure herein disclosed each layer individually is shaped so that its longitudinal edges or margins overlap, thus to create a closed hose or tubular shape, the arrangement being such that in the layer within layer placement the longitudinal edges or margins of successive layers which face each other will contact each other directly and intimately. In this manner the overlapping regions of the individual layers become distributed about a larger circumferential range of the can body. It will become apparent also that by this arrangement there is assurance that the tubular thickness of the material is substantially homogeneous over the full circumference, with this exception that at one spot in the size of the overlapping range there will exist one additional zone of the innermost or of the outermost layer of material. This is brought about without creating hollows or voids inside the wall of the can body, but rather superposing of layers which contact each other intimately and closely without interstices. Then, if the layers are adhered to each other reliably, or are connected to each other in any other suitable manner, there is imparted great strength to such a can body. Because the wall thickness remains substantially the same all over the circumference, independently of the number of layers, and regardless of whether all of the layers, or only some of them, are arranged in the described overlapped manner, there is in this manner provided in such a can body an excellent stability of shape. This is true whether the body be given a circular, oval or other type of cross section.

If the can body is intended for the accommodation of liquids and therefore the internal layer consists of a paper which is backed or lined with a liquid repellent material, or the like, then, in order to avoid the possibility of leakage at the location of overlapping in this construction the edge of the internal layer which lies inside is preferably bent around outwardly and is then connected in an overlapped manner, so that at said position of overlapping the materials which are impervious to moisture, from both the longitudinal edges, will come to lie upon each other.

The manufacture of such can bodies from a multilayer material, as now known, is complicated and time consuming. It is known in the prior art to form the can bodies from individual cutouts which successively are fed to a triblet or mandrel whereon shaping or winding occurs. These known procedures are by way of "convolute winding" of the can bodies. In such practice, in the first operation, one winds upon the mandrel a supporting paper which is backed with aluminum. Thereafter one winds a kraft paper (sulfate process paper) as an intermediate layer for the body. In this manner one may actually wind two to five layers thereof about the mandrel. Finally, a printed label with names or other indicia is placed upon the outside and is wound about the mandrel. This procedure presents problems in bringing about objectionable irregularities in the wall thickness, and also, this kind of manufacture is very difficult and time consuming.

In efforts to simplify such processes it also has been proposed to create the can bodies by a spiral winding of tapes or bands. In this way the process of manufacture becomes a continuous operation, but other difficulties are encountered. For example, at the front end of the cutoff can bodies the layer material runs out in the shape of a tip and has a tendency to pull away or become loosened from the body. One encounters great difficulties, at such spots, to get the necessary sealing and strength when one applies the lids or closures on the ends of the bodies. Also, the application of the usual labels offers great difficulties. Usually, the labels will be applied later on upon the tubular shape, by a convolute winding. If the pictures, names or other indicia on labels have the right shape, then it will be possible to produce in mass production as the labels can become wound upon such long tube continuously like a spiral. But this procedure involves much scanning and adjusting, in order to assure the accurate positioning of the indicia in the label, the desired tube diameter and the angle under which the web of labels arrives, and also, the distances between the various separating cuttings all must be accurately in register with respect to each other. Here too, in spite of the continuous production, the expenditures with respect to time consumption, and technological layouts are terrific. Also, in this procedure irregular wall thicknesses which lead to very objectionable appearance are created in addition to impairment of the stability of shape in the body of the can.

The problems hereinabove mentioned as attending efforts to develop a process for the manufacture of a can body consisting of several layers of different material and wherein the end result shall be that the can body has substantially the same overall strength and thickness have been solved by the invention disclosed herein, and the manufacture of can bodies according to this invention is simpler and cheaper than in any process known to prior art.

According to the invention procedure in manufacturing the can bodies, the layers which in their dimensions have been adjusted to the desired circumferential length of the can body are placed down staggered in the circumferential direction in a tubular shape and upon a mandrel, the edges which oppose each other circumferentially make contact with each other in a blunt manner or, in other words, as a butt joint. The individual layers may be wound upon the mandrel, one after the other, in the shape of finished cutouts. However, the procedure is much facilitated and accelerated if, according to the invention, the individual layers, prior to becoming shaped, are placed upon each other in a predetermined, staggered position, sealed to each other in such a position, as by adhesion or in any other manner, and then all such layers intended to form one unit may be assembled into the desired tubular shape in one operating step. The amount of overreaching material from one layer to the next, along the longitudinal edge or margin, corresponds always exactly to the width of overlapping. In this manner the overreaching parts or protrusions are adjusted to each other in the shaping of the tube upon the mandrel so that the edges of the successively following layers which are facing each other, or circumferentially oppose and will make intimate contact with each other, accurately forming a butt-joint. This means that the orientation of the individual layers with respect to each other, and their sealing with each other, can be accomplished before the tubular shaping. The pre-assembled parts may be produced in the shape of cutouts or sectors sufficient to form the desired tube.

Such cutouts may be produced in a continuous process, the individual layers being unwound from unwinding piles in the form of tapes, adhesive being applied to them and the layers then being placed upon each other staggeredly and sealed to each other, whereafter the required packages of cutouts may be cut off the continuous band created in this manner.

The imparting of shape of the packages of layers preferably is accomplished during a period of time when the adhesive or binder between the individual layers as not yet becomes hardened or set. In this manner the imparting of the desired shape or cross section is facilitated and the building up of internal strains in the body which might impose objectionable loading on the seams is avoided. Thus the setting or hardening of the adhesive occurs only when the can body is completely shaped and when the areas of overlapping are firmly bonded to each other. In this manner a very great strength and stability of shape in the can body is attained.

The invention presents as a very important feature the possibility of creating the can body continuously and in a simple manner as a body strand. In order to accomplish this, the procedure according to the invention starts with primary materials for the various layers which may be unwound in the shape of tape from rolls. These tapes then, so that an endless, continuous body strand may be created, have a shape imparted transversely to their longitudinal direction, so that a longitudinal seam is created, whereupon one separates from the strand, individual lengths of can body. In this manner, the new procedure offers the advantage that the overlapping edges may be made to contact each other bluntly as butt-joints during manufacture, thus to provide the desired uniform wall thickness. However, a very important thing is that the layer of labels may become deposited in exactly the same manner, for without this one must worry about the diameter of or the distances between the positions of cutting. Because the tape is unwound continuously and is deposited continuously upon the body-strand, the imprinting of the label tape may occur directly and continuously between the unwinding station and the shaping mandrel. Special steering devices or similar installations such as are required for the spiral winding, may be dispensed with. Furthermore, the new procedure, in contrast to the spiral winding procedures, is suitable also for uses wherein complicated label pictures are employed, which defy the spiral winding procedures. The separation of the individual can bodies from the body strand may occur in such uses, as a function of, or under control of, the imprinted pictures of the labels, and by aid of optical electronical control devices.

The continuous procedure according to the invention may be exploited in two manners. In one case the tapes may be pulled off continuously from their rolls and successively and individually may have their intended shapes imparted thereto upon the same mandrel, this operation including the longitudinal formation of the desired seam structure. Also, the tapes may be joined in this way to another web which has been created previously in a preceding operation step.

As special advantage is offered by another method in which the tapes are continuously pulled off their rolls and are coated with a binder, whereafter these tapes or individual webs are then staggered laterally against each other in a preselected manner, upon a common change of direction on backing surface, and are next made to meet each other where they are then joined to each other, whereby finally, the tapes which have been made to form one unit, are being continuously formed in tubular shape, wherein their longitudinal edges or margins are overlapped, and then all of the tapes at the overlapping longitudinal margins are simultaneously sealed to each other.

With the above and other objects in view that will hereinafter appear, the nature of the invention will be more clearly understood by reference to the following detailed description, the appended claims and the several views illustrated in the accompanying drawings.

In the drawings:

FIGURES 1 and 1A respectively show a cross section of a tube or body section, and an enlarged fragmentary cross section through a can body according to the invention.

FIGURE 2 shows an intermediate stage of an especially advantageous process according to the invention, for the manufacture of a body according to FIGURE 1.

FIGURES 6 through 8 show views of the same nature as FIGURES 3, 4 and 5 of a different preferred embodiment of a device for the manufacture of the can body according to the invention.

Figure 5:
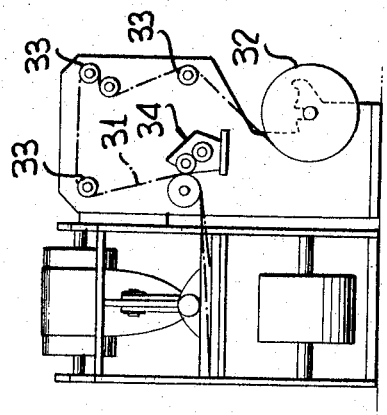
FIGURES 3, 4 and 5 show, respectively, a side view, a plan view and a cross section of a typical example of a device for the manufacture, in a continuous procedure, of the can body according to the invention.

In FIGURE 1 is shown, as a cross section, a can body 1 according to the invention. The can body consists of four layers a, b, c, d. The individual layers are always connected to each other at their longitudinal edges or margins by an overlapping, and in this manner each layer forms by itself a kind of a hose which has a strong seam and exists individually. The hoses in their circumferential direction are staggered, or rather have their overlapping marginal areas circumferentially staggered, with the edges which abut or face each other making a blunt, intimate contact with each other, similar to a butt-joint. Thus, the edge 2 going clockwise in the internal layer d, hits bluntly against or abuts the edge 3 of the next outward layer c which goes counterclockwise, as shown in FIGUE 1. In a similar way all of the other edges in the subsequent or next outward layers meet each other or engage in butt joint edge abutting contact. These opposing edge contacts always are blunt, intimate butt joint contacts.

If the internal layer d is a backed or lined layer, then its zone of overlapping will take the form shown in the enlarged fragmentary section FIGURE 1A, wherein the supporting layer is fully coated.

In this manner there is created a homogeneous wall, which has neither interstices, voids nor recesses. In addition to this the areas of overlapping of the individual layers are staggered as before stated in the circumferential direction from the inside towards the outside, as indicated by the arrow 4 in FIGURE 1. It will be noted that the regions of overlapping extend through a large peripheral angle, as indicated at 5. This means that more or less at each location about its circumference the same wall thickness is created in the wall, with the exception of the region of the terminal internal or the external area of overlapping, where the wall thickness in the overlapping width is thicker by the thickness of the outer or of the internal layer, as the case may be. This homogeneity of the wall thickness assures the provision of great strength in the wall structure and also a very good stability of shape. At the same time, this uniform wall thickness allows a much simpler and safer attaching of the lids or closures on the can body, whereas this end closure application on bodies manufactured according to the older known processes is rather difficult, due to the presence of the overlapping regions.

The can according to FIGURE 1 may be modified to provide a structure wherein the internal layers are not overlapped. In this case the internal layers are placed so that the edges of the internal layer always oppose to make a blunt, direct butt-joint contact with each other. But in this manner irregularities in the body wall thickness are introduced, and also the strength is lower, because not all the layers will form hoses which are individually closed in themselves, which hoses are connected rigidly to each other by an overlapping seam. Therefore a construction as shown in FIGURE 1 is a preferred embodiment.

The can body as shown in FIGURE 1 may be manufactured in various ways. It is possible to create the body by a convolute winding of the individual layers. But the manufacture is greatly simplified if one premanufactures the package of layers before the shaping upon a triblet or mandrel occurs. The individual layers may be piled up, measured with respect to their circumferential length plus the overlapping width, so that the individual layers are staggered laterally with respect to each other by one overlapping width always. See FIGURE 2. In this way one would unite the layers with each other, as by an adhesive, so that a package of layers is formed which is one unit. This package of layers may be trimmed and then used to form one individual can body, upon a mandrel, in one step of operation, whereby the correct overlapping of the individual layers is brought about automatically, and with the longitudinal or marginal edges placed close to each other in butt-joint relation or intimate contact without voids. The overlapping regions then, in one and the same operation with the shaping, can become permanently closed. The shaping of the packages of layers occurs then preferably at such a time when the adhesive or binder between the individual layers is not yet solidified; that means that a hardening or setting will take place only after the act of shape-imparting action is completed. This means that slippage between adhesive bearing layers is permitted and only small stresses are introduced into the can body.

The packages of layers may be manufactured continuously from webs which are supplied continuously, but in staggered relation, which staggering could be accomplished by the action of sealing or connecting roller means, from which webs one next severs the cutouts or sectors from which the individual can bodies are formed.

This new type of can body may be produced simply in a continuous process without requirement of large investments in money and machine tools. This also means that the manufacturing speeds are very high, yet the process of manufacturing is quite precise. In contrast to the spiral winding procedure known in the prior art, in the process according to the invention the webs are pulled off the winding rolls and are shaped upon the mandrel so that a longitudinal overlapping area is created in which the longitudinal edges or margins of the individual layers contact each other closely and directly, that is, intimately, with edge extremities of successive layers in butt-joint contact and without voids in the assembly.

Figure 3:
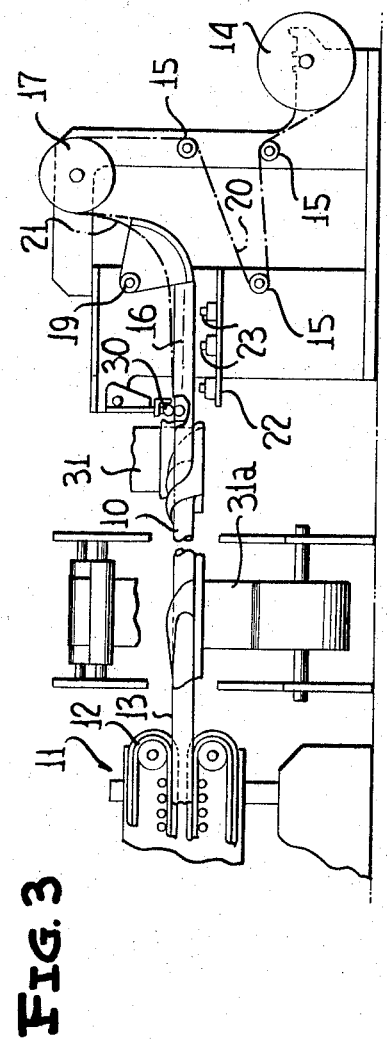
Figure 4:
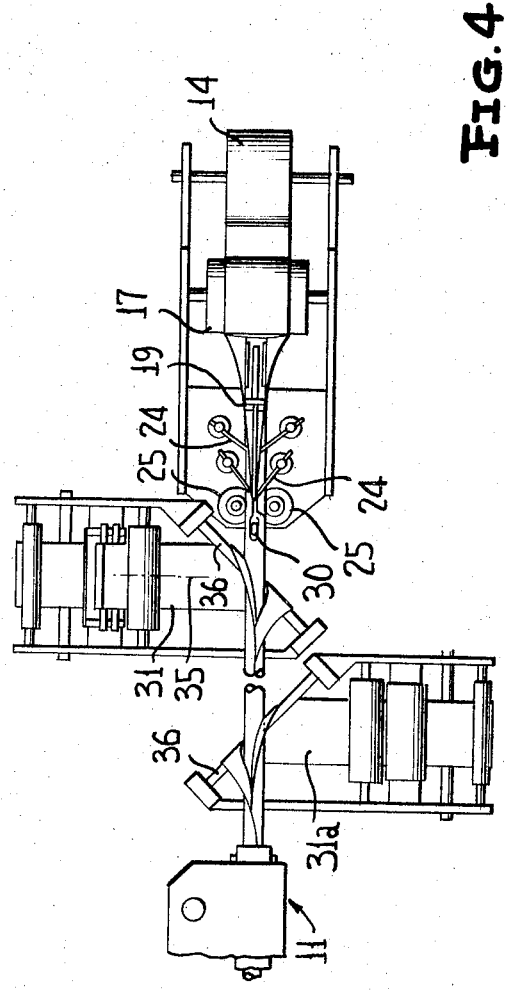

FIGURES 3 to 5 show a typical example for the exploitations of the new procedure. The apparatus or device, as shown in FIGURE 3, includes a shaping mandrel 10, upon which the strand or layer assembly of can body stock is continuously shaped. At the end of the shaping mandrel there is positioned a removal or take-away device 11 in the shape of a caterpillar-like pull off unit, the caterpillars 12 of which engage continuously with the can body tube stock 13 and pull it off. In FIGURE 3 this occurs towards the left. Behind this caterpillar pull off is provided a separation device or cross cutting means (not shown) for cutting off the individual lengths of can bodies. It is to be understood that several pull off devices are coordinated with the mandrel, the number of these pull off or withdrawal devices depending upon the number of layers being assembled in lapped relation to make up the can body. In the typical example shown three such layers are being assembled. The first layer is pulled off a roll 14, is guided across several rollers 15 so that there is imparted thereto the necessary tension, and then is fed to the mandrel by the aid of a feeding or direction changing roller means 17 placed at a lateral distance with respect to the mandrel axis 16.

Between the feed roller 17 and the beginning of the mandrel 10 a shaping segment 18 is located, with its bottom end disposed to pass almost continuously, that is, without steps, onto the mandrel 10. This segment is swung, in the manner of a pitch circle, upwardly in a direction toward the feed roller 17. This shaping segment, in order better to impart the desired web directing action, is supported upon an axis 19 in a tiltable manner. The shaping segment 18 is much narrower than the width of the supplied tape 20, as will be apparent by a comparison of FIGURES 3 and 4.

Because the tubular strand or web assembly is under tension, due to the action of the removal device 11, and also because the tape 20 is supplied under tension, said tape 20 is pulled around the shaping segment 18 with such a tension that the lateral edges 21 of the tape become laterally curved up around the shaping segment. Therefore, the tape in this region is caused to assume a cross section which looks like the letter U. In this shape the tape is delivered from the segment 18 onto the receiving portion of the mandrel 10. In this region of this receiving portion of the mandrel, and upon a console 22, there are placed shaping parts 23. These may consist of several shaping rods 24 arranged in pairs, and which are placed along the sides of the web as best shown in FIGURE 4 so that they may be tilted and effective to engage the upwardly directed sides of the tape 20 in a manner for gradually directing the web side margins together into overlapping relation over the mandrel 10. The lapped over longitudinal edges or margins of the tape are next pressed against each other in their overlapping relation by aid of pairs of shaping rollers 25. The rollers 25 are adapted to the cross section of the mandrel so that they will squeeze the tape intimately all around the mandrel.

It is to be understood that the mandrel may be circular, oval or any desired shape.

In this example disclosure it is assumed that the tape or web 20 is a foil of a polymer or a similar material which is impervious to liquids. In order to create the desired longitudinal seam in this foil layer, a recess has been provided in the mandrel within which a conventional roll type foil sealing or welding means 30 is arranged so that one welding roller engages inside the tubular strand, as an opposing roller engages outside the strand at the overlapping seam. Such a welding device need not be described in detail here, because, as mentioned, such devices are known in the prior art.

The other tapes or webs 31 and 31a in this example disclosure are fed toward the mandrel from the side, at right angular relation to the mandrel. Each tape supplying means includes a roll of material 32, tensioning and direction changing rollers 33, and a unit 34 for depositing an adhesive or binder upon the paper web. This web or tape is then fed always across an angularly placed direction change roller 36. Each said roller 36 bears an angular relation with the axis 16 of the mandrel as well as with the axis 35 of the web, and the direction change roller 36 will collaborate with a shaping shoulder on the mandrel, or upon a first layer previously deposited there, so that the layer is deposited in the shape of a hose. The adhesive or binder material bonds the second layer to the first layer, so that both layers now form one tubular unit. The third layer is deposited in the same manner and, whenever desired, any other number of additional layers may be laid on.

The direction change rollers 36 and the pull off devices 11 are adjusted and placed so that the successive layers are deposited in proper shape and orientation with respect to any preceding layer or layers, namely with the longitudinal edges of the layers following upon each other, meeting each other bluntly and without provision of any voids, in intimate contact as a butt joint. In order to assure this accurate orienting, the feed rollers 36 may be supported adjustably.

In the modified typical example disclosed in FIGURES 6 to 8, the arrangement of the installation is essentially the same as in the typical example above described. Thus the arrangement again includes a shaping mandrel 50 behind which is placed a pull off device 51, and also a body length severing or cut off device (not shown). At the reeciving end of the shaping mandrel shaping parts 52 are arranged, these being in the form of shaping rods or similar elements, in pairs, as shown in FIGURE 7. These rods, which can be adjusted, are disposed to engage the pushed up sides of the webs or tapes, as previously described. Behind these shaping rods are arranged one or more pairs of shaping rollers 53 and 54, which place the tape or web tightly around the shaping mandrel, as previously described. The feeding here again takes place over a direction change roller 56 arranged in a lateral distance from the axis 55 of the mandrel 50, between which roller 56 and the shaping mandrel 50, a shaping segment 57 is provided and is constructed and performs in the same manner as the shaping segment 18 previously described in connection with the typical example shown in FIGURES 3 to 5.

However, in contrast to the typical example described first in connection with FIGURES 3 to 5, the supplying of the individual layers to the shaping mandrel 50 now under discussion now occurs in the axial direction of said mandrel. In order to bring this about the four feeding devices provided are arranged one behind the other, in the direction of the shaping axis. Each shaping device again contains a roll or reel of material 60, several tensioning and direction change rollers 61, a device 62 for the deposition of an adhesive or binder material, and, if so desired, a predrying device (not shown). All four webs or tapes *a* through *d* are fed to the common direction change and feed roller 56 upon which the layers with the coating of adhesive or binder material thereon are permanently sealed to each other. This is accomplished under the action of a squeeze roller means 63. It is preferred that the various layers or coatings be made to contact each other successively. As indicated in FIGURE 6, the webs *c* and *d* are fed already combined into another pair of rollers 64, by aid of which the web *b* becomes combined with webs *c* and *d*. These three webs then are fed toward the feeding roller 56, where a combining with the outermost layer *a* occurs.

As will be apparent from FIGURES 7 and 8, the webs are supplied in the desired laterally staggered manner, so that there always remains a piece the size of the overlap width protruding laterally from the succeeding layer. The overlapping widths have been selected so that the edges of layers which follow each other, will make a blunt, intimate butt-joint contact with each other after completion of the shaping action. The overlapping edges or margins which are coated with adhesive, binder or similar material, will not be acted upon by the compressing roller 63.

For the predrying of the adhesive or similar binder material there may be provided between the individual pairs of rollers such as 64 and 63, some predrying devices 70, as previously mentioned. This predrying preferably should not be overdone, thus to assure that the adhesive does not become too dry. It is of advantage if the combination of the tapes or webs *a* through *d* are made to arrive in the shaping device in a state in which the adhesive is not yet completely hardened. In this manner the shaping of the package of layers by aid of the shaping rods 52 and by the shaping rollers 53 and 54 may occur much easier, slippage of layer over layer being permitted and the shaping being completed without having to overcome so much resistance. Furthermore, the shaped body tube will have only small internal stresses. The adhesive will then harden only after the tubular body has received its final shaping.

After completing of the shaping in the package of the layers, the prepared overlapping web widths will become rigidly squeezed together by aid of a pair of compression rollers 71, the webs or layers being firmly sealed to each other. In this way there is provided a package from several tapes of diversified materials in one continuous operation, accurately and without special auxiliary means for the orientation of the layers, in the manner previously described, and thus a tubular strand, hank or skein is created, in which the longitudinal edges meet each other bluntly, or in butt-joint relation and without voids.

Because the outermost layer, as a rule, is a label-layer, in this new arrangement, it is possible to place a printing device for the creation of the label legends between the pull off roller 60 and the direction change roller 56 for the tape *a*. It is preferred that the printing unit be placed between the pull off roller 60 and the device 62 which serves to apply the adhesive.

The steering of the body length or unit separation or cut off device (not shown) may be controlled in an electro-optical manner, whereby the label is scanned by a photoelectric cell means and the signal created in this way serves in the steering of said separating device.

Preferred disclosures of article and machine structure and part arrangements, and of method steps, have been made herein, but it is to be understood that variations may be made in the disclosed forms and steps without departing from the spirit and scope of the invention as defined in the appended claims.

I claim:

1. The method of forming a can body comprising several individual tubular layers in intimate contact one over another and each having full length lapped marginal edges to each present an inner and an outer circumferentially presented terminal edge characterized in that the layers are edge staggered and selected as to width for collectively providing the desired circumferential dimension when the layers are formed into a tube and in this relation are deposited on to a mandrel to create the desired tubular shape, and in said shaping bringing the terminal edge of each layer opposing another layer terminal edge into intimate butt-joint contact with said opposing terminal edge; and wherein the innermost layer is backed up by a film which is impervious to liquid and has its longitudinal inner edge folded outwardly upon itself prior to creation of the overlapping seam at this inner terminal point.

2. The method defined in claim 1, and wherein the bonding is effected through employment of an adhesive applied to the layers before shaping, and wherein the shaping takes place prior to setting of the adhesive.

3. The method of forming a can body comprising several individual tubular layers in intimate contact one over another and each having full length lapped marginal edges to each present an inner and on outer circumferentially presented terminal edge characterized in that the layers, prior to shaping, are placed upon each other over a mandrel in circumferentially staggered relation and in dimension for collectively providing the desired circumference of the body cross-section, are secured with the terminal edge of each layer opposing the terminal edge of another layer and are bonded together in tubular form all in a continuous operational step; further characterized in that individual layers are formed from tapes delivered from roll supplies, and in a direction laterally toward the mandrel and over an angularly placed direction change member positioned to bring about the desired circumferential stagger lapping of the layers.

4. In apparatus of the character described, a longitudinally extending shaping mandrel, individual layer tape supply rolls, means for drawing individual tapes off said rolls and onto and along said mandrel, means for applying an adhesive to each said tape on its way to the mandrel, and means for shaping the tapes in tubular form on the mandrel to provide individual tubular layers one within another and bonded to each other each with longitudinal lapped margins presenting an inner and an outer circumferentially presented terminal edge and with all said terminal edges of the layers except the outermost and innermost thereof contacting bluntly and intimately in butt-joint relation; wherein each tape is brought to the mandrel individually over a direction change guide in a manner for placing the tapes on the mandrel sequentially, said guides being placed to bring about the desired lapping of the layers in circumferentially staggered relation about the mandrel.

5. In apparatus of the character described, a longitudinally extending shaping mandrel, individual layer tape supply rolls, means for drawing individual tapes off said rolls and onto and along said mandrel, means for applying an adhesive to each said tape on its way to the mandrel, and means for shaping the tapes in tubular form on the mandrel to provide individual tubular layers one within another and bonded to each other each with longitudinal lapped margins presenting an inner and an outer circumferentially presented terminal edge and with all said terminal edges of the layers except the outermost and innermost thereof contacting bluntly and intimately in butt-joint relation; wherein there are provided means for bringing the desired complement of tapes into superposed and lapped staggered relation prior to deposition of the tapes on the mandrel, thereby to apply all layers at one and the same time so that shaping of all layers about the mandrel will also take place simultaneously; and wherein the shaping means includes an arcuate guide over which the complement of tapes is drawn onto the mandrel and disposed to impart an upstanding U-shape to said complement with upright sides of the U-shape extending above the mandrel, lay over rods for directing the upstanding sides of the U-shape progressively into overlapping relation over the mandrel, and shaping rolls to complete the shaping of the superposed layers in tubular form about the mandrel as the continous tube is being drawn over the mandrel.

6. Apparatus as defined in claim 4 wherein the shaping means includes an arcuate guide over which the first presented tape is drawn onto the mandrel and disposed to impart an upstanding U-shape to said first presented tape with upright sides of the U-shape extending above the mandrel, lay over rods for directing the upstanding sides of the U-shape progressively into overlapping relation over the mandrel, and shaping rolls to complete the shaping of said first layers, together with sealer roll means for sealing the lap of said first layer, and there also being included individual direction change guide means engageable by the successively laid tapes and placed to be effective to direct said tapes individually from a lateral line of direction toward the mandrel to a position along the mandrel with placement of the tapes to bring about the desired circumferential staggering of the layer laps about the mandrel.

7. The method defined in claim 3, and the inwardly directed and underlapped terminal edge of each succeedingly shaped layer presented in intimate butt joint engagement against the outwardly directed overlapping terminal edge of the precedingly shaped layer.

8. Apparatus as defined in claim 4, and for directing the inwardly directed and underlapped terminal edge of each succeedingly shaped layer presented in intimate butt joint engagement against the outwardly directed overlapping terminal edge of the precedingly shaped layer.

9. Apparatus as defined in claim 6 wherein the first presented tape includes a heat sealable face and the sealer roll means serves to heat weld the lap of said first layer.

References Cited by the Examiner

UNITED STATES PATENTS

| | | | |
|---|---|---|---|
| 445,135 | 1/1891 | Denney | 93—82 |
| 1,634,067 | 6/1927 | Bates | 93—82 XR |
| 1,969,889 | 8/1934 | Koch et al. | 138—151 |
| 2,083,969 | 6/1937 | Walter | 93—82 |
| 2,246,043 | 6/1941 | Heinmets | 93—94 X |
| 2,256,263 | 9/1941 | Haycock | 93—82 |
| 2,422,725 | 6/1947 | Gilfillan | 138—151 |
| 2,424,315 | 7/1947 | Hyatt et al. | 93—82 X |
| 2,660,219 | 11/1953 | Haas et al. | 93—82 X |
| 2,714,997 | 8/1955 | Weisbart | 93—82 X |
| 3,134,310 | 5/1964 | Petee | 93—81 |
| 3,185,577 | 5/1965 | Krause | 93—94 X |
| 3,190,195 | 6/1965 | Snyderman et al. | 93—81 |

BERNARD STICKNEY, *Primary Examiner.*

EARL M. BERGERT, *Examiner.*

P. DIER, *Assistant Examiner.*